United States Patent
Marti et al.

(10) Patent No.: US 11,935,557 B2
(45) Date of Patent: Mar. 19, 2024

(54) TECHNIQUES FOR DETECTING AND PROCESSING DOMAIN-SPECIFIC TERMINOLOGY

(71) Applicant: HARMAN INTERNATIONAL INDUSTRIES, INCORPORATED, Stamford, CT (US)

(72) Inventors: Stefan Marti, Oakland, CA (US); Evgeny Burmistrov, Saratoga, CA (US); Joseph Verbeke, San Francisco, CA (US); Priya Seshadri, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 31 days.

(21) Appl. No.: 17/164,030

(22) Filed: Feb. 1, 2021

(65) Prior Publication Data

US 2022/0246168 A1 Aug. 4, 2022

(51) Int. Cl.
*G10L 25/00* (2013.01)
*G10L 15/08* (2006.01)
*G10L 21/0208* (2013.01)
*G10L 25/78* (2013.01)

(52) U.S. Cl.
CPC .............. *G10L 25/78* (2013.01); *G10L 15/08* (2013.01); *G10L 21/0208* (2013.01)

(58) Field of Classification Search
CPC ..... G10L 25/78; G10L 15/08; G10L 21/0208; G10L 21/04; G06F 3/165; G06F 3/16; G06F 3/162; G11B 20/10527
See application file for complete search history.

(56) References Cited

U.S. PATENT DOCUMENTS

| 8,434,685 | B1* | 5/2013 | Lewbel | G06F 3/1423 |
| | | | | 359/296 |
| 9,697,265 | B2* | 7/2017 | Story, Jr. | H04L 67/1095 |
| 10,356,366 | B2* | 7/2019 | Zalewski | H04N 21/812 |
| 10,459,686 | B1* | 10/2019 | Lenke | G11B 27/038 |
| 10,848,712 | B1* | 11/2020 | Rao | H04N 21/4307 |
| 2009/0031037 | A1* | 1/2009 | Mendell | H04N 21/44016 |
| | | | | 709/231 |
| 2010/0153324 | A1* | 6/2010 | Downs | G06N 3/08 |
| | | | | 706/55 |
| 2012/0246343 | A1* | 9/2012 | Story, Jr. | G06F 16/27 |
| | | | | 709/248 |

(Continued)

OTHER PUBLICATIONS

"Mohammed Abdel Razek, Credible Mechanism for More Reliable Search Engine Results, Jan. 2015, International Journal of Information and Communication Technology, 03, 12-17" (Year: 2015).*

*Primary Examiner* — Douglas Godbold
*Assistant Examiner* — Parker Mayfield
(74) *Attorney, Agent, or Firm* — Artegis Law Group, LLP

(57) ABSTRACT

Various embodiments set forth systems and techniques for explaining domain-specific terms detected in a media content stream. The techniques include detecting a speech portion included in an audio signal; determining that the speech portion comprises a domain-specific term; determining an explanatory phrase associated with the domain-specific term; and integrating the explanatory phrase associated with the domain-specific term into playback of the audio signal.

13 Claims, 3 Drawing Sheets

(56) References Cited

U.S. PATENT DOCUMENTS

| | | | |
|---|---|---|---|
| 2013/0041747 A1* | 2/2013 | Anderson | H04N 21/8133 |
| | | | 715/733 |
| 2013/0073675 A1* | 3/2013 | Hwang | G06F 16/94 |
| | | | 709/217 |
| 2013/0124988 A1* | 5/2013 | Lettau | G06F 40/103 |
| | | | 715/277 |
| 2017/0076713 A1* | 3/2017 | Gildein, II | H04N 7/15 |

* cited by examiner

TECHNIQUES FOR DETECTING AND PROCESSING DOMAIN-SPECIFIC TERMINOLOGY

BACKGROUND

Field of the Various Embodiments

Embodiments disclosed herein relate to audio devices and, in particular, techniques for detecting and processing domain-specific terminology.

Description of the Related Art

Recent advances in technologies such as personal computers and the internet have resulted in proliferation of social media and networking websites that provide many opportunities for interaction, participation, and collaboration between users with different backgrounds, languages, domain-expertise, or the like. These advances have also created opportunities for users to easily engage in media content streams (e.g., real-time collaborations, real-time conversations, live audio, podcasts, social media live streaming content, or the like) and access content covering a broad range of topics for which they may not have subject-matter expertise. In addition, experts in different fields have more opportunities to engage in or consume media content streams with other experts around the world.

However, during such media content streams, certain participants may use domain-specific terminology (e.g., jargon, abbreviations, acronyms, colloquial expressions, or the like) that other participants or listeners with different backgrounds, languages, domain-expertise, or the like may not understand. Such domain-specific terminology creates a barrier that prevents listeners lacking the specific domain knowledge from being able to follow the media content stream, thereby hampering the interaction, collaboration, participation, or the like of such users.

While experts in certain domains could simplify the language used during such media content streams, certain domain-specific terminology are deeply embedded in the lexicon of a domain so as to be unavoidable when speaking about that domain. Furthermore, the broad range of proficiency levels and domain expertise of the users that tend to engage in or consume media content streams makes it difficult to determine the kind of language to use without spending too much time explaining terminology that might be obvious to many in the audience.

While participants in such media content streams can look up the domain-specific terminology using online resources (e.g., search engines), there is no practical way of performing the lookup of such terminology while also speaking or engaging in a real-time manner with the ongoing media content stream or while consuming the media content stream without interrupting the content. Further, such lookups can take a considerable amount of time and effort, especially when a user encounters domain-specific terminology that requires sifting through many search results to determine the authoritative source of information and/or the most plausible explanation. As a result of the time and effort required to find and read the relevant explanations of the domain-specific terminology, many users lose track of the ongoing media content stream, to follow content, or the like.

Accordingly, there is a need for techniques that allow users to determine the explanation of domain-specific terminology while keeping track of a media content stream or media content stream being consumed.

SUMMARY

Embodiments of the present disclosure set forth a computer-implemented method for explaining domain-specific terms detected in a media content stream, the method comprising detecting a speech portion included in an audio signal; determining that the speech portion comprises a domain-specific term; determining an explanatory phrase associated with the domain-specific term; and integrating the explanatory phrase associated with the domain-specific term into playback of the audio signal.

Other embodiments include, without limitation, a computer system that performs one or more aspects of the disclosed techniques, as well as one or more non-transitory computer-readable storage media including instructions for performing one or more aspects of the disclosed techniques.

At least one technological advantage of the disclosed approach relative to the prior art is that by automatically inserting explanations of domain-specific terminology into a real-time conversation or other real-time audio stream, the disclosed approaches allow a user focus on the conversation or the audio stream without expending the time and effort required to look up explanations, interrupting the conversations or audio streams, or the like. Further, providing explanations of domain-specific terminology enables a user to better understand the topic discussed in the conversation or audio stream while continuing to focus on the conversation or audio stream, thereby better equipping the user to understand, follow, respond, participate, interact, collaborate, or the like with the conversations or audio streams. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
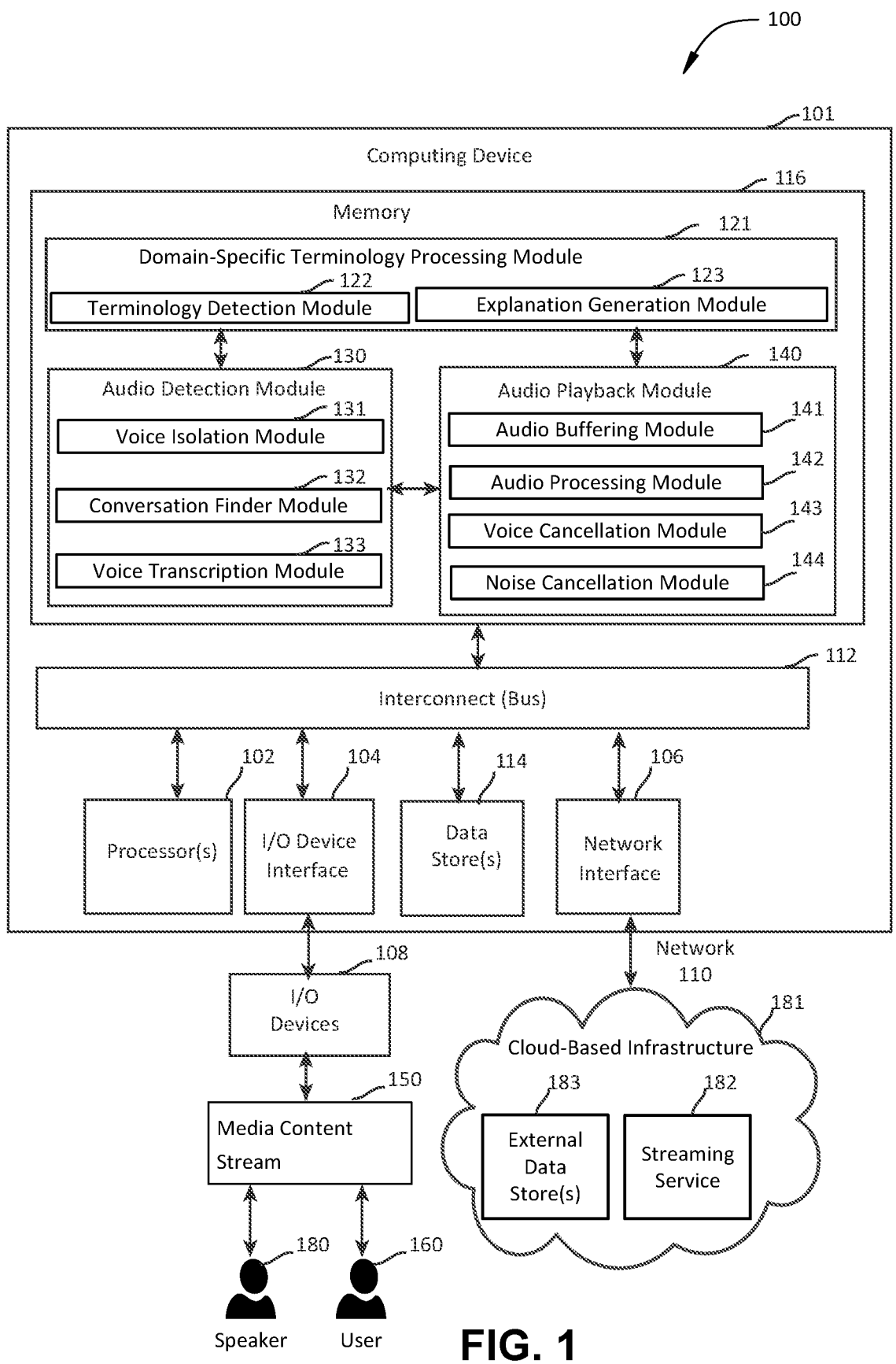
FIG. 1 illustrates a domain-specific terminology detection and processing system, configured to implement one or more aspects of the various embodiments of the present disclosure.

FIG. 1 illustrates a domain-specific terminology detection and processing system 100, configured to implement one or more aspects of the various embodiments of the present disclosure. As shown, domain-specific terminology detection and processing system 100 includes, without limitation, computing device 101, an interconnect (bus) 112 that connects one or more processor(s) 102, an input/output (I/O) device interface 104 coupled to one or more input/output (I/O) devices 108, memory 116, an internal data store 114, and a network interface 106 coupled to a network 110.

Computing device 101 is consistent with a desktop computer, a laptop computer, a smart phone, a personal digital assistant (PDA), tablet computer, or any other type of computing device configured to receive input, process data, and optionally display images, and is suitable for practicing one or more embodiments. Computing device 101 described herein is illustrative and any other technically feasible configurations fall within the scope of the present disclosure.

In some embodiments, computing device 101 includes any technically feasible internet-based computing system, such as a distributed computing system or a cloud-based storage system. In some embodiments, computing device 101 includes, without limitation, a plurality of networks, a plurality of servers, a plurality of operating systems, a plurality of storage devices, or the like. The server may be a standalone server, a cluster or "farm" of servers, one or more network appliances, or any other device suitable for implementing one or more aspects of the present disclosure.

In some embodiments, computing device 101 includes various forms of audiovisual-based systems, such as personal headphones, earpieces, mobile devices, AR/VR gear and head-mounted displays, wearables (wrist watch, wristband, smart rings, thimble, smart necklaces, etc.), hearables (in-ear canal devices, smart earbuds, hearing aids), around-neck audio devices, smart eyeglasses, smart hats, smart helmets, integrated in clothing (shirt, scarf, belt, etc.), integrated into jewelry (ear ring, bracelet, necklace, arm bracelet), smart home devices (e.g., smart lighting systems, security systems, digital assistants, etc.), communications systems (e.g., conference call systems, video conferencing systems, etc.), or the like. In some embodiments, computing device 101 includes a head unit included in a vehicle system or at-home entertainment system. In some embodiments, computing device 101 may be located in various environments including, without limitation, building environments (e.g., living room, conference room, home office, etc.), road vehicle environments (e.g., consumer car, commercial truck, etc.), aerospace and/or aeronautical environments (e.g., airplanes, helicopters, spaceships, etc.), nautical and submarine environments, outdoor environments, or the like.

Memory 116 includes a random access memory (RAM) module, a flash memory unit, or any other type of technically feasible memory unit or combination thereof on computing device 101. Processor(s) 102, I/O device interface 104, and network interface 106 are configured to read data from and write data to memory 116. In some embodiments, any of the software programs or modules on domain-specific terminology detection and processing system 100 are stored in memory 116 on computing device 101. Memory 116 includes, without limitation, domain-specific terminology processing module 121, audio detection module 130, and/or audio playback module 140. In some embodiments, any of the modules and/or applications included in memory 116 could be executed on a remote device (e.g., a smartphone, a server system, a cloud computing platform, etc.) that communicates with computing device 101 via network interface 106, I/O devices interface 104, or the like.

Domain-specific terminology processing module 121 includes any technically feasible component that parses the one or more speech portions of an audio signal associated with one or more participants of media content stream 150 (e.g., speaker 180 or the like) and to determine whether the speech portion contains a domain-specific term. In some embodiments, domain-specific terminology processing module 121 searches one or more data stores (e.g., internal data store(s) 114, external data store(s) 183, or the like) to identify one or more explanations associated with the domain-specific term. In some embodiments, domain-specific terminology processing module 121 searches multiple data stores and applies weights (e.g., heavier weights to more reliable external data stores 183, heavier weights to data retrieved from internal data store(s) 114 and lower weights to data retrieved from external data stores 183, or the like) to each search result when determining whether to use the explanation obtained from a given data store to generate an explanatory phrase. In some embodiments, domain-specific terminology processing module 121 generates an explanatory phrase from one or more explanations obtained from multiple data stores based on whether the weight associated with a given explanation is above a threshold value. In some embodiments, domain-specific terminology processing module 121 maintains a domain-specific term database in internal data store(s) 114 or the like that contains domain-specific terms and the corresponding explanatory phrases or the like. In some embodiments, the domain-specific term database is created based on dynamically generated information, historical information associated with one or more media content streams (e.g., previous domain-specific terms associated with the related media content streams, collective intelligence or feedback received from other related media content streams, historical domain-specific terms associated with speaker 180), information associated with the user profile (e.g., user's domains of knowledge, offline dictionary of common or typical words, list of common terms, list of terms known by the user, a blacklist of domains or domain-specific terms the user 160 is not familiar with), or the like.

In some embodiments, domain-specific terminology processing module 121 provides a user interface that enables a user to provide input about specific internal data store(s) 114, external data store(s) 183, or the like to use for looking up domain-specific terms. In some embodiments, the user interface may take any feasible form for providing the functions described herein, such as one or more buttons, toggles, sliders, dials, knobs, etc., or as a graphical user interface (GUI). In some embodiments, the user interface may be provided by a separate computing device that is communicatively coupled with computing device 101, such as through an application running on a user's mobile or wearable computing device. In another example, user interface may receive verbal commands for user selections. In this case, computing device 101 may perform speech recognition on the received verbal commands and/or compare the verbal commands against commands stored in memory 116. After verifying the received verbal commands, computing device 101 could then execute the associated commanded function (e.g., performing a lookup of a domain-specific term in an external data store 183).

In some embodiments, the user interface receives user input (e.g., key thought detected by an EEG or similar sensor, voice command, jaw clench, sensor detected user action indicative of feedback, or the like) in real-time or at any point during playback of media content stream 150 and/or offline at a later time to indicate whether an explanatory phrase needs to be played back or repeated, confirm whether an explanatory phrase is acceptable, reject an explanatory phrase associated with a domain-specific term, request a new search for a different explanatory phrase associated with the domain-specific term, or the like. In some embodiments, the user interface receives user feedback regarding the contextual information (e.g., subject matter, contextual cues) associated with the domain-specific term, the media content stream 150, or the like. In some embodiments, the user interface allows a user to create, update, or delete information associated with a user profile that contains user preferences (e.g., minimum or maximum allowed playback speed), user's domains of knowledge, dictionary of common or typical words, list of common terms, a blacklist of domains or domain-specific terms the user 160 is not familiar with, when to use one or more modules (e.g., voice isolation module, conversation finder module, noise cancellation module, voice cancellation module), explanation count (e.g., the number of times an explanatory phrase for a domain-specific term has been provided, whether to omit the explanatory phrase if the explanation count is over a configurable threshold value), or the like. Domain-specific terminology processing module 121 includes, without limitation, terminology detection module 122, and/or explanation generation module 123.

Terminology detection module 122 continually analyzes and parses one or more speech portions and related sensor data to determine whether a given speech portion contains a domain-specific term. In some embodiments, terminology detection module 122 analyzes contextual cues (e.g., verbal cues, non-verbal cues, one or more words before or after the speech portion, sensor data obtained from one or more sensors, or the like) associated with a media content stream when assessing whether the speech portion contains a domain-specific term. In some embodiments, terminology detection module 122 performs various natural language processing (NLP) techniques, speech analysis, or the like in order to identify whether a speech portion contains a domain-specific term. In some embodiments, terminology detection module 122 determines whether a speech portion contains a domain-specific term based on the transcript or the like generated by voice transcription module 133 as described in further detail below. In some embodiments, terminology detection module 122 compares the speech portion against information associated with a user profile (e.g., user's domains of knowledge, offline dictionary of common or typical words, list of common terms, list of terms known by the user, a blacklist of domains or domain-specific terms the user 160 is not familiar with, or the like) to determine whether the speech portion contains a domain-specific term.

Explanation generation module 123 receives a domain-specific term identified by terminology detection module 122 and searches one or more data store(s) (e.g., internal data store(s) 114, external data store(s) 183, or the like) to identify one or more explanations associated with the domain-specific term. In some embodiments, explanation generation module 123 searches multiple data store(s) (e.g., internal data store(s) 114, external data store(s) 183, or the like) and applies distinct weights (e.g., applying heavier weights to more reliable external data stores 183, applying heavier weights to data retrieved from internal data store(s) 114 and lower weights to data retrieved from external data stores 183, or the like) to each search result. In some embodiments, the distinct weights are based on historical data indicating the reliability of a given external data store 183. In some embodiments, explanation generation module 123 determines one or more explanations that are the most appropriate matches for the domain-specific term based on contextual cues (e.g., verbal cues, non-verbal cues, one or more words before or after the speech portion, sensor data obtained from one or more sensors, or the like). In some embodiments, contextual cues may include sensor data associated with the speech portion (e.g., sensor data associated with speaker 180 or the like).

In some embodiments, explanation generation module 123 generates an explanatory phrase based on the one or more explanations included in the search results. In some embodiments, explanation generation module 123 generates an explanatory phrase that combines one or more portions of explanations from different data stores (e.g., internal data store(s) 114, external data store(s) 183, or the like). In some embodiments, explanation generation module 123 generates an explanatory phrase based on the weights applied to the explanations obtained from the different data stores. In some embodiments, explanation generation module 123 generates a confidence value indicating the likelihood that the explanatory phrase contains the right explanation associated with the domain-specific term.

Audio detection module 130 includes any technically feasible component configured to detect an audio signal associated with media content stream 150 or the like. In some embodiments, audio detection module 130 detects one or more voices associated with one or more participants of media content stream 150 or the like. In some embodiments, audio detection module 130 detects real-time voices or the like associated with media content stream 150. In some embodiments, audio detection module 130 uses a machine learning model to determine whether or not a human voice is present in media content stream 150, an audio signal, or the like.

In some embodiments, audio detection module 130 detects the audio signal associated with one or more participants of media content stream 150 using any number of auditory sensors, which may be attached to or integrated with other system components, or disposed separately. In some embodiments, audio detection module 130 acquires sensor data associated with one or more participants of media content stream 150. In some embodiments, audio detection module 130 applies speech processing techniques to the audio signal such as vocal tone heuristics, voice stress analysis (VSA), voice lie detection, voice sentiment analysis, or the like. Audio detection module 130 includes, without limitation, voice isolation module 131, conversation finder module 132, and/or voice transcription module 133.

Voice isolation module 131 uses one or more voice isolation techniques to continuously monitor voices detected in an audio signal associated media content stream 150. In some embodiments, when voice isolation module 131 detects a dominant voice (e.g., loudest voice) associated with one or more participants of media content stream 150 (e.g., speaker 180 or the like), voice isolation module cancels out background noise and other less dominant voices. In some embodiments, voice isolation module 131 enables voice cancellation, noise cancellation, or the like to cancel out background noise, less dominant voices, or the like. In some embodiments, voice isolation module 131 acquires a speech portion made by one or more participants of media content stream 150 (e.g., speaker 180 or the like) without acquiring an auditory signal made by other participants (e.g., user 160 or the like). For example, I/O device(s) 108 could include a directional microphone array that forms a steerable beam directed towards one or more participants of media content stream 150 (e.g., speaker 180 or the like). In such instances, I/O device(s) 108 could acquire a speech portion from one or more participants of media content stream 150 (e.g., speaker 180 or the like) without acquiring speech from other participants (e.g., user 160 or the like).

Conversation finder module 132 determines whether one or more voices and/or conversations in the environment surrounding or proximate to user 160, speaker 180, or the like are associated with media content stream 150. In some embodiments, conversation finder module uses one or more techniques such as eye gaze detection (e.g., whether the person associated with the voice is looking at user 160, speaker 180, or the like), analyzing turn taking behavior (e.g., whether the detected voice takes turns with the voices associated with user 160, speaker 180, or the like), or the like.

Voice transcription module 133 uses one or more voice transcription techniques to generate a textual representation of each word contained in an audio signal associated media content stream 150. In some embodiments, voice transcription module 133 changes the audio signal received from I/O device(s) 108 to a different modality of content (e.g., speech to text). Further, in some embodiments, the textual representation may include a verbatim or near-verbatim transcript of some or all of the auditory content received from I/O device(s) 108, summarized text associated with some or all of the auditory content received from I/O device(s) 108, or the like. In some embodiments, voice transcription module 133 performs a word level analysis, sentence level analysis, or the like in order to disambiguate each word contained in the audio signal. In some embodiments, voice transcription module 133 uses one or more word-sense disambiguation techniques to disambiguate each word based on contextual cues (e.g., verbal cues, non-verbal cues, one or more words before or after the speech portion, sensor data obtained from one or more sensors, or the like).

Audio playback module 140 generates an audio signal that drives an I/O device 108 to emit soundwaves corresponding to the audio signal. In some embodiments, audio playback module 140 generates an audio signal integrating the explanatory phrase into a given speech portion associated with the media content stream 150. In some embodiments, audio playback module 140 determines a playback speed of the audio signal associated media content stream 150. In some embodiments, audio playback module 140 determines the playback speed based on one or more factors such as a user preference for playback speed associated with user 160 (e.g., speed up ratio predetermined by the user), a playback speed associated with a user input received via a user interface, a time interval associated with the media content stream, a length of the portion of the audio signal stored in the audio buffer, network speed (e.g., speeding up playback when the network is fast, and slowing down playback when there is a network delay), or the like. In some embodiments, audio playback module 140 is configured to playback the audio buffer, the synthesized explanatory phrase, or the like at an increased playback speed (e.g., 1.5×, 2×, or the like) until the audio signal catches up with the media content stream 150. Consequently, user 160 can listen to the audio buffer, the synthesized explanatory phrase, or the like in a time interval having a shorter duration than the actual duration of the audio buffer, the synthesized explanatory phrase, or the like. Thus, in such embodiments, the audio buffer, the synthesized explanatory phrase, or the like can be played back relatively quickly to user 160. In some embodiments, audio playback module 140 enables voice cancellation, noise cancellation, or the like during playback of the audio buffer, the synthesized explanatory phrase, or the like. In some embodiments, audio playback module 140 enables voice cancellation, noise cancellation, or the like during integration of the explanatory phrase into the playback of the audio signal. Audio playback module 140 includes, without limitation, audio buffering module 141, audio processing module 142, voice cancellation module 143, and/or noise cancellation module 144.

Audio buffering module 141 generates and stores an audio buffer of an audio signal associated media content stream 150. In some embodiments, the audio buffer associated with the audio signal is stored in internal data store(s) 114, external data store(s) 183, or the like. In some embodiments, audio buffering module 141 turns-off audio pass-through functionality in I/O device(s) 108 when generating the audio buffer. In some embodiments, audio buffering module 141 enables voice cancellation, noise cancellation, or the like when generating or playing back the audio buffer.

Audio processing module 142 uses one or more audio processing techniques, voice enhancement techniques, voice interjection techniques, or the like to integrate the generated explanatory phrase with the audio signal associated with media content stream 150. In some embodiments, audio processing module 142 uses voice synthesis techniques to generate an acoustic representation of one or more voices associated with one or more participants of media content stream 150 (e.g., speaker 180, user 160, or the like). In some embodiments, audio processing module 142 applies voice synthesis techniques to synthesize the explanatory phrase generated by explanation generation module 123 and generates an output signal to drive one or more I/O devices to emit an output signal (e.g., soundwaves or the like) corresponding to the synthesized explanatory phrase.

In some embodiments, audio processing module 142 enables or disables audio pass-through functionality (e.g., ambient aware, hear-through technology, ambient pass-through) associated with I/O device(s) 108. In some embodiments, when audio pass-through is enabled, user 160 does not hear external sounds directly, but only what is passed through from the microphones to the audio amplifier to the speakers in the I/O device(s) 108. In some embodiments, user 160 hears the voice of speaker 180 in real-time without any recording, modification, or the like. In some embodiments, audio processing module 142 intercepts external voices, and, if necessary, replaces external audio with a different audio signal.

Voice cancellation module 143 cancels one or more voices external to the audio signal, such as voices present in the environment surrounding or proximate to user 160, speaker 180, or the like. For example, voice cancellation module 143 may include any technically feasible voice cancellation algorithm or the like. In such embodiments, user 160 can listen to playback of the audio signal without being distracted by other voices and/or conversation in the environment surrounding or proximate to user 160, speaker 180, or the like.

Noise cancellation module 144 cancels noise external to the audio signal, such as noise present in the environment surrounding or proximate to user 160, speaker 180, or the like. For example, noise cancellation module 144 can include any technically feasible noise cancellation algorithm or the like. In such embodiments, user 160 can listen to playback of the audio signal without being distracted by background noise in the environment surrounding or proximate to user 160, speaker 180, or the like.

Interconnect (bus) 112 includes one or more reconfigurable interconnects that links one or more components of computing device 101 such as one or more processors, one or more input/output ports, data store(s), memory, or the like. In some embodiments, interconnect (bus) 112 combines the functions of a data bus, an address bus, a control bus, or the like. In some embodiments, interconnect (bus) 112 includes an I/O bus, a single system bus, a shared system bus, a local bus, a peripheral bus, an external bus, a dual independent bus, or the like.

Processor(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, processor(s) 102 may be any technically feasible hardware unit capable of processing data and/or executing software applications. Further, in the context of this disclosure, the computing elements shown in computing device 101 may correspond to a physical computing system (e.g., a system in a data center) or may be a virtual computing instance executing within a computing cloud.

I/O device interface 104 enables communication of I/O devices 108 with processor(s) 102. I/O device interface 104 generally includes the requisite logic for interpreting addresses corresponding to I/O devices 108 that are generated by processor(s) 102. I/O device interface 104 may also be configured to implement handshaking between processor(s) 102 and I/O devices 108, and/or generate interrupts associated with I/O devices 108. I/O device interface 104 may be implemented as any technically feasible CPU, ASIC, FPGA, any other type of processing unit or device.

I/O devices 108 include devices capable of providing input, such as a keyboard, a mouse, a touch-sensitive screen, a microphone, a remote control, and so forth, as well as devices capable of providing output, such as a display device. Additionally, I/O devices 108 can include devices capable of both receiving input and providing output, such as a touchscreen, a universal serial bus (USB) port, and so forth. I/O devices 108 may be configured to receive various types of input from an end-user of computing device 101, and to also provide various types of output to the end-user of computing device 101, such as displayed digital images or digital videos or text. In some embodiments, one or more of I/O devices 108 are configured to couple computing device 101 to a network 110.

In some embodiments, I/O devices 108 can include, without limitation, a smart device such a personal computer, personal digital assistant, tablet computer, mobile phone, smart phone, media player, mobile device, or any other device suitable for implementing one or more aspects of the present invention. I/O devices 108 can augment the functionality of computing device 101 by providing various services, including, without limitation, telephone services, navigation services, infotainment services, or the like. Further, I/O devices 108 can acquire data from sensors and transmit the data to computing device 101. I/O devices 108 can acquire sound data via an audio input device and transmits the sound data to computing device 101 for processing. Likewise, I/O devices 108 can receive sound data from computing device 101 and transmit the sound data to an audio output device so that the user can hear audio originating from computing device 101.

In some embodiments, I/O devices 108 include sensors that perform measurements and/or acquire data related to certain subjects associated with a media content stream. In some embodiments, the sensors are configured to acquire biometric data from the user and transmit signals associated with the biometric data to computing device 101. The biometric data acquired by the sensors can then be processed by a software application running on computing device 101. In various embodiments, I/O devices 108 include any type of visual sensor (e.g., camera, thermal imager, position sensor, etc.), electrical sensor, biometric sensor, audio sensor, or the like, that is capable of acquiring biometric data including, for example and without limitation, a camera, an electrode, a microphone, or the like. In some embodiments, the sensors may be disposed in any feasible manner in the environment such as directional (e.g., forward-facing microphone, beamforming microphone array, outward relative to output devices, etc.), worn by a user, disposed separately at a fixed location, movable, or the like. In some embodiments, the sensors include an array of transducers or sensors of a single type, or a variety of different sensors, or the like.

In some embodiments, I/O devices 108 include physiological sensors for electroencephalography (EEG), which can measure electrical activity in the brain (e.g., brain wave patterns) of user 160, speaker 180, or the like. In such embodiments, physiological sensors include two or more EEG sensors that are configured to contact a surface of a head of user 160 and a sensor that is coupled to an electrical ground, such as another surface of the body of user 160. In some embodiments, I/O devices 108 includes a plurality of EEG sensors, where a first portion of the plurality of EEG sensors are configured to contact surfaces on the first hemisphere of the head (e.g., the left half of the head) and a second portion of the plurality of EEG sensors are configured to contact surfaces on the second hemisphere of the head (e.g., the right half of the head). In some embodiments, an EEG sensor is configured to detect a key thought or the like. A key thought may be any nonce word or short phrase that is easy to remember but does not commonly occur in day-to-day thinking activities, such as "pink elephant," "granola tower," "furry tree," and/or the like.

In some embodiments, I/O devices 108 include, without limitation, input devices, output devices, and devices capable of both receiving input data and generating output data. I/O devices 108 can include, without limitation, wired or wireless communication devices that send data to or receive data from smart devices, headphones, smart speakers, sensors, remote databases, other computing devices, or the like. Additionally, in some embodiments, I/O devices 108 may include a push-to-talk (PTT) button, such as a PTT button included in a vehicle, on a mobile device, on a smart speaker, or the like.

In some embodiments, I/O devices 108 include headphones, ear buds, a speaker system (e.g., one or more loudspeakers, amplifier, etc.), or any other device that generates an acoustic field. In various embodiments, I/O devices 108 may be implemented using any number of different conventional form factors, such as discrete loudspeaker devices, around-the-ear (circumaural), on-ear (supra-aural), or in-ear headphones, hearing aids, wired or wireless headsets, body-worn (head, shoulder, arm, etc.) listening devices, body-worn close-range directional speakers or speaker arrays, body-worn ultrasonic speaker arrays, or the like.

Internal data store(s) 114 include any technically feasible storage infrastructure for storing and managing collections of data. In some embodiments, internal data store(s) 114 include non-volatile storage for applications and data, and may include fixed or removable disk drives, flash memory devices, and CD-ROM, DVD-ROM, Blu-Ray, HD-DVD, or other magnetic, optical, solid state storage devices, or the like. In some embodiments, any of the software programs on computing device 101 are stored in internal data store(s) 114 and loaded into memory 116 when executed.

Network 110 includes any technically feasible type of communications network that allows data to be exchanged between computing device 101 and external entities or devices, such as a web server or another networked computing device. For example, network 110 may include a wide area network (WAN), a local area network (LAN), a wireless (WiFi™) network, and/or the Internet, among others.

Network interface 106 is a computer hardware component that connects processor 102 to a communication network. Network interface 106 may be implemented in computing device 101 as a stand-alone card, processor, or other hardware device. In some embodiments, network interface 106 may be configured with cellular communication capability, satellite telephone communication capability, a wireless WAN communication capability, or other types of communication capabilities that allow for communication with a communication network and other computing devices external to computing device 101.

Cloud-based infrastructure 181 can be any technically feasible Internet-based computing system, such as a distributed computing system or a cloud-based storage system. In some embodiments, cloud-based infrastructure 181 includes, without limitation, a plurality of networks, a plurality of servers, a plurality of operating systems, a plurality of storage devices, or the like. The server may be a stand-alone server, a cluster or "farm" of servers, one or more network appliances, or any other device suitable for implementing one or more aspects of the present disclosure.

Streaming service 182 provides media content streams (e.g., real-time collaborations, real-time conversations, live audio, podcasts, social media live streaming content, conference call session, phone call, or the like) available in a cloud-based infrastructure 181. In some embodiments, streaming service 182 provides a variety of digital content (e.g., movies, games, music, podcasts, news, sports, audio, video, ringtones, advertisements, broadcasts, or the like) associated with the media content streams. In some embodiments, streaming service 182 provides access to media content streams stored in a content repository. In some embodiments, the media content streams are also stored locally on computing device 101, such as in internal data store(s) 114. In some embodiments, streaming service 182 includes a web-based program for selecting media content streams. In some embodiments, media content streams available via streaming service 182 can be selected automatically based on data acquired from one or more sensors located on one or more smart devices associated with I/O devices 108. For instance, media content streams on streaming service 182 can be selected based on a sensor on smart device associated with I/O devices 108 capturing the user voice selection, motion, gesture, or the like associated with the selection of a media content stream, or the like.

External data store(s) 183 include any technically feasible storage infrastructure for storing and managing collections of data on an internet-based computing system associated with cloud-based infrastructure 181. In some embodiments, external data store(s) 183 include various libraries that act as a source of truth, source of information, source of knowledge, or the like for various domain-specific terms. For example, external data store(s) 183 may include backends for search engines, online encyclopedias, fact-checking websites, news websites, or the like.

In some embodiments, external data store(s) 183 include one or more real-time databases, one or more cloud databases, one or more temporal databases, one or more logic databases, one or more heterogeneous datastores, one or more relational databases, one or more file systems, one or more distributed datastores, one or more directory services, one or more active databases, one or more data warehouses, one or more distributed databases, one or more embedded database systems, one or more document-oriented databases, one or more federated database systems, one or more array database management systems, or the like. In some embodiments, external data store(s) 183 operates on a plurality of servers, a plurality of storage devices, or the like. The server may be a standalone server, a cluster or "farm" of servers, one or more network appliances, or the like. In some embodiments, external data store(s) 183 include data managed by one or more teams, one or more business entities, or the like.

In operation, audio detection module 130 detects an audio signal associated with one or more participants of media content stream 150 (e.g., speaker 180, user 160, or the like). Domain-specific terminology processing module 121 uses terminology detection module 122 to parse the one or more speech portions of an audio signal associated with one or more participants of media content stream 150 (e.g., speaker 180 or the like) and to determine whether the speech portion contains a domain-specific term. Domain-specific terminology processing module 121 uses explanation generation module 123 to search one or more data stores (e.g., internal data store(s) 114, external data store(s) 183, or the like) to identify one or more explanations associated with the domain-specific term. Domain-specific terminology processing module 121 uses explanation generation module 123 to generate an explanatory phrase from one or more explanations. Audio playback module 140 uses audio buffering module 141 to generate and store an audio buffer of an audio signal occurring after the domain-specific term while audio playback module 140 performs the search and provides the explanatory phrase to user 160. Audio playback module 140 uses audio processing module 142 to integrate the generated explanatory phrase with the audio signal associated with media content stream 150. Audio playback module 140 adjusts the playback speed (e.g., selects an increased playback speed) of the audio buffer, the synthesized explanatory phrase, or the like until the playback of the audio signal catches up with the media content stream 150. When audio playback module 140 determines that the playback of the audio signal has caught up with the actual playback position of the media content stream 150, audio playback module 140 enables audio pass-through and disables audio buffering, voice cancellation, noise cancellation, or the like.

Techniques for Detecting and Processing Domain-Specific Terminology

Figure 2A:
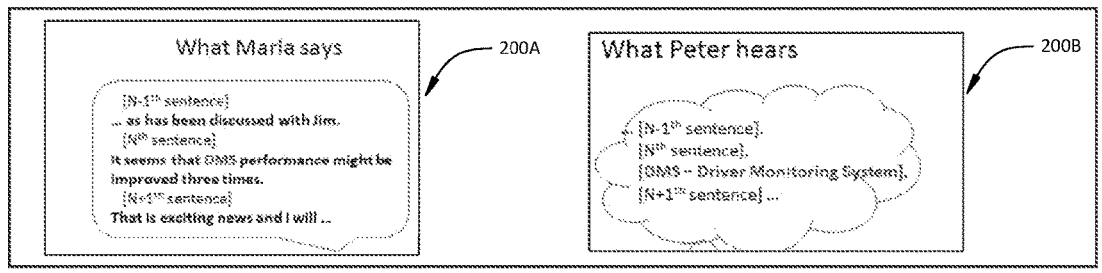
FIG. 2A illustrates a technique for detecting and processing domain-specific terminology in media content streams, according to various embodiments of the present disclosure.

FIG. 2A illustrates a technique for detecting and processing domain-specific terminology in media content streams, according to various embodiments of the present disclosure. Although the technique is described in conjunction with the system of FIG. 1, persons skilled in the art will understand that any system configured to perform the steps associated with the technique in any order falls within the scope of the present disclosure.

200A illustrates words associated with a detected audio signal associated with a media content stream 200A. In the example, the detected audio signal associated with speaker 180 contains the N−1th sentence, the Nth sentence containing domain-specific term "DMS", and the N+1th sentence.

200B illustrates playback of the audio signal associated with the media content stream 200B. In the example, the playback of the audio signal includes the N−1th sentence, the Nth sentence containing domain-specific term, a synthesized explanatory phrase associated with the domain-specific term, and the N+1th sentence.

Figure 2B:
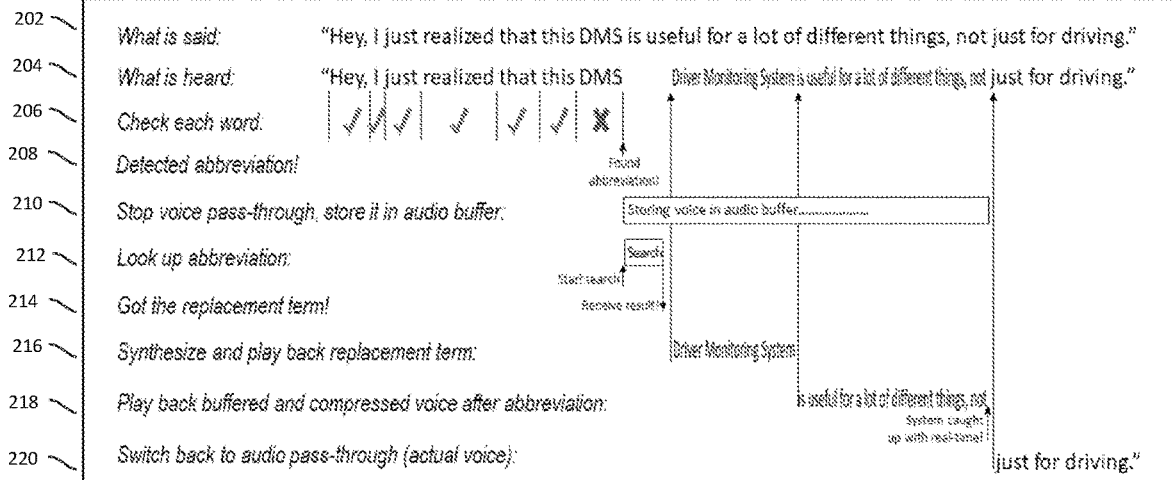
FIG. 2B illustrates a technique for detecting and processing domain-specific terminology in media content streams, according to various embodiments of the present disclosure.

FIG. 2B illustrates a technique for detecting and processing domain-specific terminology in media content streams, according to various embodiments of the present disclosure. Although the technique is described in conjunction with the system of FIG. 1, persons skilled in the art will understand that any system configured to perform the steps associated with the technique in any order falls within the scope of the present disclosure.

In step 202, audio detection module 130 determines what is said by one or more one or more participants of media content stream 150 (e.g., speaker 180 or the like). In some embodiments, audio detection module 130 detects an audio signal associated with one or more participants of media content stream 150 (e.g., speaker 180 or the like). In some embodiments, audio detection module 130 detects one or more voices associated with media content stream 150 using any number of auditory sensors, which may be attached to or integrated with other system components, or disposed separately. In some embodiments, audio detection module 130 uses voice isolation module 131 to detect a dominant voice (e.g., loudest voice) associated with one or more participants of media content stream 150 (e.g., speaker 180 or the like), and cancels out background noise and other less dominant voices. In some embodiments, audio detection module 130 uses conversation finder module 132 to determine whether one or more voices and/or conversations in the environment surrounding or proximate to user 160, speaker 180, or the like are associated with media content stream 150.

In step 204, which is implemented concurrently with steps 206-220, audio playback module 140 plays back an audio signal to user 160. In some embodiments, audio playback module 140 uses audio processing module 142 to integrate a synthesized explanatory phrase (e.g., Driver Monitoring System) associated with a domain-specific term (e.g., DMS) into the audio signal associated with media content stream 150. In some embodiments, the domain-specific term (e.g., DMS) is completely removed from the audio signal played back to the user and is replaced by the synthesized explanatory phrase (e.g., Driver Monitoring System). In some embodiments, the synthesized explanatory phrase is sped up so the synthesized explanator phrase has the same duration or the like as the domain-specific term. In some embodiments, audio playback module 140 is setup to incorporate a delay of a predetermined duration (e.g., a duration dynamically determined based on the maximum length of a domain-specific term that can be replaced, a duration dynamically determined based on the length of time needed to detect and replace the domain-specific term, or the like) between detecting an audio signal associated with one or more participants of media content stream 150 and playing back the audio signal to user 160. In some embodiments, audio playback module 140 switches back to the media content stream 150 after playing back the synthesized explanatory phrase. In some embodiments, audio playback module 140 uses audio buffering module 141 to generate and store an audio buffer of an audio signal occurring after the domain-specific term. In some embodiments, audio playback module 140 is configured to increase playback speed of the audio buffer, the synthesized explanatory phrase, or the like until the audio signal catches up with the media content stream 150. In some embodiments, audio playback module 140 enables voice cancellation, noise cancellation, or the like during playback of the audio buffer, the synthesized explanatory phrase, or the like.

In steps 206 and 208 which are performed concurrently with step 204, domain-specific terminology processing module 121 checks each word associated with the audio signal to determine whether the word is a domain-specific term, and detects a domain-specific term (e.g., the abbreviation, DMS). In some embodiments, domain-specific terminology processing module 121 uses terminology detection module 122 to parse the one or more speech portions of the audio signal associated with media content stream 150 to determine whether the speech portion contains a domain-specific term. In some embodiments, terminology detection module 122 performs various natural language processing (NLP) techniques, speech analysis, or the like in order to identify whether a speech portion contains a domain-specific term. In some embodiments, terminology detection module 122 determines whether a speech portion contains a domain-specific term based on the transcript or the like generated by voice transcription module 133.

In optional step 210, audio playback module 140 stops audio pass-through and generates and stores an audio buffer of the audio signal occurring after the domain-specific term. In some embodiments, audio playback module 140 uses audio buffering module 141 to generate and store the audio buffer.

In step 212, domain-specific terminology processing module 121 uses explanation generation module 123 to lookup the domain-specific term. In some embodiments, domain-specific terminology processing module 121 uses explanation generation module 123 to search one or more data stores (e.g., internal data store(s) 114, external data store(s) 183, or the like) to identify one or more explanations associated with the domain-specific term. In some embodiments, explanation generation module 123 uses explanation generation module 123 to apply weights (e.g., heavier weights to more reliable external data stores 183, heavier weights to data retrieved from internal data store(s) 114 and lower weights to data retrieved from external data stores 183, or the like) to each search result when determining whether to use the explanation obtained from a given data store to generate an explanatory phrase.

In step 214, domain-specific terminology processing module 121 uses explanation generation module 123 to generate an explanatory phrase (e.g., Driver Monitoring System) associated with the domain-specific term (e.g., DMS). In some embodiments, domain-specific terminology processing module 121 generates an explanatory phrase from one or more explanations obtained from multiple data stores based on whether the weight associated with a given explanation is above a threshold value. In some embodiments, explanation generation module 123 generates a confidence value indicating the likelihood that the explanatory phrase contains the right explanation associated with the domain-specific term. In some embodiments, domain-specific terminology processing module 121 generates an explanatory phrase based on the confidence value assigned to the one or more explanations (e.g., selecting an explanation with the highest confidence value, generating an explanatory phrase that combines one or more explanations with a confidence value above a threshold value, or the like).

In step 216, audio playback module 140 synthesizes and plays back the explanatory phrase. In some embodiments, the playback of the generated explanatory phrase overlaps with the playback of the media content stream 150 (e.g., when audio pass-through is enabled or the like). In some embodiments, audio playback module 140 uses audio processing module 142 to integrate the generated explanatory phrase with the audio signal associated with media content stream 150. In some embodiments, audio processing module 142 uses voice synthesis techniques to generate an acoustic representation of one or more voices associated with one or more participants of media content stream 150 (e.g., speaker 180, user 160, or the like). In some embodiments, audio processing module 142 applies voice synthesis techniques to synthesize the explanatory phrase generated by explanation generation module 123 and generates an output signal to drive one or more I/O devices to emit an output signal (e.g., soundwaves or the like) corresponding to the synthesized explanatory phrase.

In step 218, audio playback module 140 plays back the audio buffer of the audio signal occurring after the domain-specific term. In some embodiments, audio playback module 140 determines a playback speed of the audio signal associated media content stream 150 based on one or more factors such as a user preference for playback speed associated with user 160, a playback speed associated with a user input received via a user interface, a time interval associated with the media content stream, or the like. In some embodiments, audio playback module 140 is configured to playback the audio buffer, the synthesized explanatory phrase, or the like at an increased playback speed until the audio signal catches up with the media content stream 150. Consequently, user 160 can listen to the audio buffer, the synthesized explanatory phrase, or the like in a time interval having a shorter duration than the actual duration of the audio buffer, the synthesized explanatory phrase, or the like. In some embodiments, during steps 210-218, audio buffering module 141 enables voice cancellation, noise cancellation, or the like when generating the audio buffer. In some embodiments, during steps 210-218, audio buffering module 141 disables audio pass-through to prevent user 160 from hearing media content stream 150. In such embodiments, user 160 does not hear external sounds directly, but only what is passed through from the microphones to the audio amplifier to the speakers in the I/O device(s) 108.

In step 220, audio playback module 140 switches back to audio pass-through. In some embodiments, user 160 hears the voice of speaker 180 in real-time without any recording, modification, or the like. In some embodiments, audio processing module 142 intercepts external voices, and, if necessary, replaces external audio with a different audio signal. In some embodiments, enabling audio pass-through triggers audio buffering module 141 to stop generating an audio buffer associated with media content stream 150.

Figure 3:
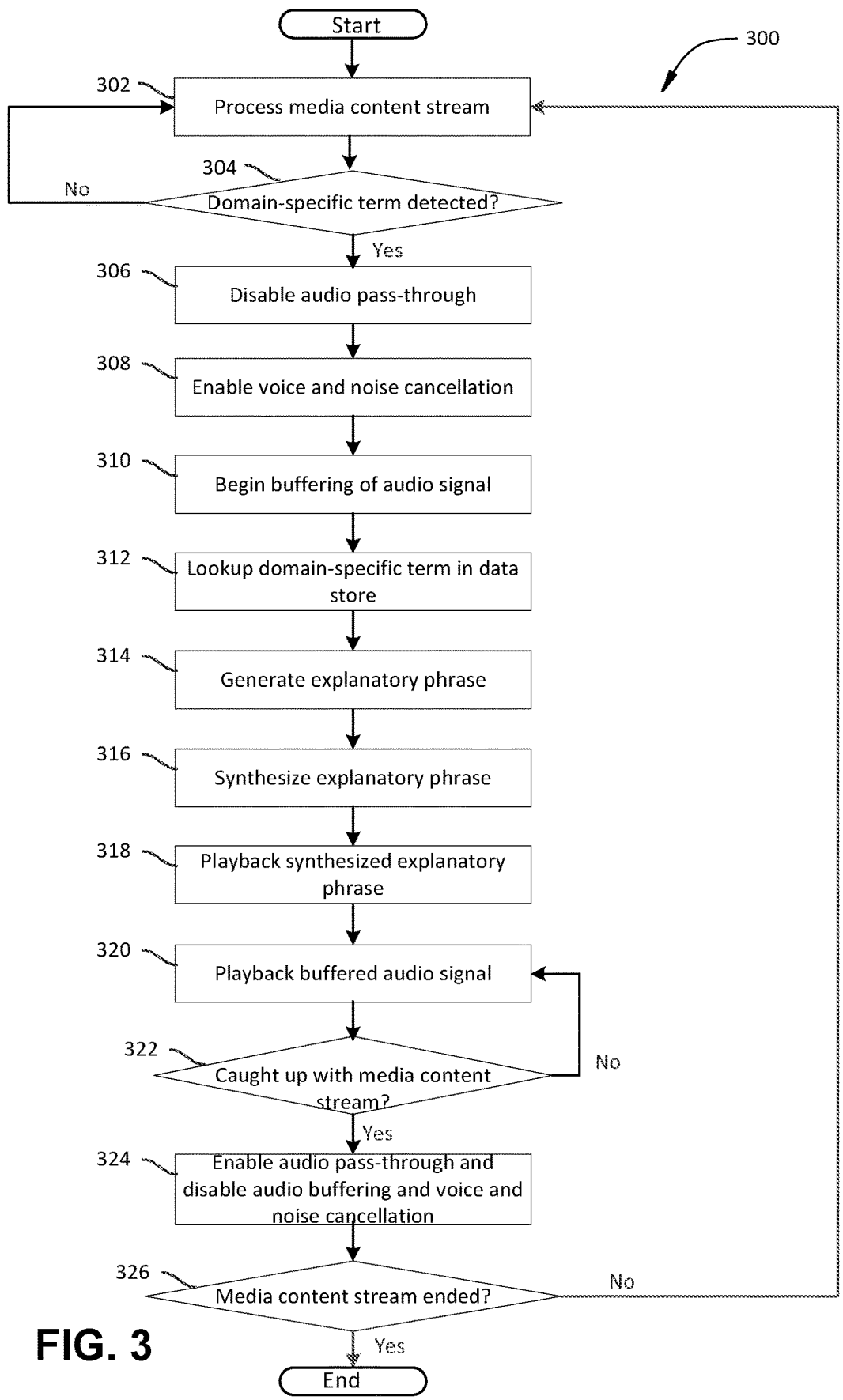
FIG. 3 is a flowchart of method steps for detecting and processing domain-specific terminology in media content streams, according to various embodiments of the present disclosure.

FIG. 3 is a flowchart of method steps for detecting and processing domain-specific terminology in media content streams, according to various embodiments of the present disclosure. Although the method steps are described in conjunction with the system of FIG. 1, persons skilled in the art will understand that any system configured to perform the method steps in any order falls within the scope of the present disclosure.

In step 302, audio detection module 130 processes a media content stream. In some embodiments, audio detection module 130 detects an audio signal associated with one or more participants of media content stream 150 (e.g., speaker 180, user 160, or the like). In some embodiments, audio detection module 130 detects one or more voices associated with media content stream 150 using any number of auditory sensors. In some embodiments, audio detection module 130 uses voice transcription module 133 to generate a textual representation of each word contained in an audio signal associated media content stream 150. In some embodiments, voice transcription module 133 uses one or more word-sense disambiguation techniques to disambiguate each word based on contextual cues (e.g., verbal cues, non-verbal cues, one or more words before or after the speech portion, sensor data obtained from one or more sensors, or the like).

In step 304, domain-specific terminology processing module 121 determines whether the audio signal contains a domain-specific term. In some embodiments, domain-specific terminology processing module 121 uses terminology detection module 122 to parse the one or more speech portions of an audio signal associated with one or more participants of media content stream 150 (e.g., speaker 180 or the like) and to determine whether the speech portion contains a domain-specific term. In some embodiments, terminology detection module 122 performs various natural language processing (NLP) techniques, speech analysis, or the like in order to identify whether a speech portion contains a domain-specific term.

When domain-specific terminology processing module 121 determines that the audio signal contains a domain-specific term, method 300 advances to step 306. When domain-specific terminology processing module 121 determines that the audio signal does not contain a domain-specific term, method 300 returns to step 302.

In step 306, audio playback module 140 disables audio pass-through. In some embodiments, audio playback module 140 stops the real-time transmission of the audio signal associated with media content stream 150.

In step 308, audio playback module 140 enables voice and/or noise cancellation. In some embodiments, audio playback module 140 uses noise cancellation module 144 to cancel noise external to the audio signal, such as background noise present in the environment surrounding or proximate to user 160, speaker 180, or the like. In some embodiments, audio playback module 140 uses voice cancellation module 143 to cancel one or more voices external to the audio signal, such as voices present in the environment surrounding or proximate to user 160, speaker 180, or the like.

In step 310, audio playback module 140 uses audio buffering module 141 to begin buffering the audio signal occurring after the domain-specific term. In some embodiments, the audio buffer associated with the audio signal is stored in internal data store(s) 114, external data store(s) 183, or the like.

In step 312, domain-specific terminology processing module 121 uses explanation generation module 123 to lookup the domain-specific term in one or more data stores. In some embodiments, domain-specific terminology processing module 121 uses explanation generation module 123 to search one or more data stores (e.g., internal data store(s) 114, external data store(s) 183, or the like) to identify one or more explanations associated with the domain-specific term. In some embodiments, explanation generation module 123 determines one or more explanations that are the most appropriate matches for the domain-specific term based on contextual cues (e.g., verbal cues, non-verbal cues, one or more words before or after the speech portion, sensor data obtained from one or more sensors, or the like).

In step 314, domain-specific terminology processing module 121 uses explanation generation module 123 to generate an explanatory phrase from the one or more explanations. In some embodiments, domain-specific terminology processing module 121 generates an explanatory phrase from one or more explanations obtained from multiple data stores based on whether the weight associated with a given explanation is above a threshold value. In some embodiments, explanation generation module 123 generates a confidence value indicating the likelihood that the explanatory phrase contains the right explanation associated with the domain-specific term. In some embodiments, domain-specific terminology processing module 121 generates an explanatory phrase based on the confidence value assigned to the one or more explanations (e.g., selecting an explanation with the highest confidence value, generating an explanatory phrase that combines one or more explanations with a confidence value above a threshold value, or the like).

In step 316, audio playback module 140 uses audio processing module 142 to synthesize the explanatory phrase. In some embodiments, audio processing module 142 uses voice synthesis techniques to generate an acoustic representation of one or more voices associated with one or more participants of media content stream 150 (e.g., speaker 180, user 160, or the like). In some embodiments, audio processing module 142 applies voice synthesis techniques to synthesize the explanatory phrase generated by explanation generation module 123 based on the generated acoustic representation. In some embodiments, audio processing module 142 generates an output signal to drive one or more I/O devices to emit an output signal (e.g., soundwaves or the like) corresponding to the synthesized explanatory phrase.

In step 318, audio playback module 140 plays back the synthesized explanatory phrase. In some embodiments, audio playback module 140 uses audio processing module 142 to integrate a synthesized explanatory phrase (e.g., Driver Monitoring System) associated with a domain-specific term into the audio signal associated with media content stream 150. In some embodiments, audio playback module 140 is configured to increase playback speed of the synthesized explanatory phrase. In some embodiments, the synthesized explanatory phrase is played back so as to replace the domain-specific term in the media content stream 150 or the like. In some embodiments, the synthesized explanatory phrase is integrated into the audio signal played back to user 160 in a seamless way that does not interrupt playback of the media content stream 150 or the like. In some embodiments, a count of the number of times an explanatory phrase for the domain-specific term has been provided may be incremented.

In step 320, audio playback module 140 plays back the buffered audio signal. In some embodiments, audio playback module 140 is configured to increase playback speed of the buffered audio signal or the like until the audio signal catches up with the media content stream 150. In some embodiments, writing into the audio buffer and reading from the audio buffer occur concurrently. In some embodiments, writing into the audio buffer occurs in real-time, while reading from the audio buffer is performed at a playback speed determined by audio playback module 140.

In step 322, audio playback module 140 determines whether the playback of the audio signal has caught up with the media content stream 150 (e.g., real-time speech of speaker 180 or the like). When audio playback module 140 determines that the playback of the audio signal has caught up with the actual playback position of the media content stream 150, method 300 advances to step 324. When audio playback module 140 determines that the playback of the audio signal has not caught up with the actual playback position of the media content stream 150, the procedure reverts to step 320.

In step 324, audio playback module 140 enables audio pass-through and disables audio buffering, voice cancellation, noise cancellation, or the like. In some embodiments, audio playback module 140 enables the real-time transmission of the audio signal associated with media content stream 150. In some embodiments, audio playback module 140 disables audio buffering module 141, noise cancellation module 144, voice cancellation module 143, or the like.

In step 326, audio playback module 140 determines whether the playback of the media content stream 150 has ended. When audio playback module 140 determines that the playback of the media content stream 150 has ended, method 300 is complete. When audio playback module 140 determines that the playback of the media content stream 150 has not ended, method 300 returns to step 302.

In sum, audio detection module 130 detects an audio signal associated with one or more participants of media content stream 150 (e.g., speaker 180, user 160, or the like). Domain-specific terminology processing module 121 uses terminology detection module 122 to parse the one or more speech portions of an audio signal associated with one or more participants of media content stream 150 (e.g., speaker 180 or the like) and to determine whether the speech portion contains a domain-specific term. Domain-specific terminology processing module 121 uses explanation generation module 123 to search one or more data stores (e.g., internal data store(s) 114, external data store(s) 183, or the like) to identify one or more explanations associated with the domain-specific term. Domain-specific terminology processing module 121 uses explanation generation module 123 to generate an explanatory phrase from the one or more explanations. Audio playback module 140 uses audio buffering module 141 to generate and store an audio buffer of an audio signal associated with media content stream 150. Audio playback module 140 adjusts the playback speed (e.g., selects an increased playback speed) of the audio buffer, the synthesized explanatory phrase, or the like until the playback of the audio signal catches up with the media content stream 150. When audio playback module 140 determines that the playback of the audio signal has caught up with the actual playback position of the media content stream 150, audio playback module 140 enables audio pass-through and disables audio buffering, voice cancellation, noise cancellation, or the like.

At least one technological advantage of the disclosed approach relative to the prior art is that by automatically inserting explanations of domain-specific terminology into a real-time conversation or other real-time audio stream, the disclosed approaches allow a user focus on the conversation or the audio stream without expending the time and effort required to look up explanations, interrupting the conversations or audio streams, or the like. Further, providing explanations of domain-specific terminology enables a user to better understand the topic discussed in the conversation or audio stream while continuing to focus on the conversation or audio stream, thereby better equipping the user to understand, follow, respond, participate, interact, collaborate, or the like with the conversations or audio streams. These technical advantages provide one or more technological advancements over prior art approaches.

1. In some embodiments, a computer-implemented method for explaining domain-specific terms detected in a media content stream comprises: detecting a speech portion included in an audio signal; determining that the speech portion comprises a domain-specific term; determining an explanatory phrase associated with the domain-specific term; and integrating the explanatory phrase associated with the domain-specific term into playback of the audio signal.

2. The computer-implemented method of clause 1, wherein the explanatory phrase is based on one or more contextual cues associated with the detected speech portion.

3. The computer-implemented method of clauses 1 or 2, wherein the one or more contextual cues include one or more words before or after the speech portion.

4. The computer-implemented method of clauses 1-3, wherein integrating the explanatory phrase into the playback of the audio signal comprises storing, in an audio buffer, a portion of the audio signal occurring after the domain-specific term.

5. The computer-implemented method of clauses 1-4, wherein integrating the explanatory phrase into the playback of the audio signal further comprises playing back the portion of the audio signal stored in the audio buffer using an increased playback speed.

6. The computer-implemented method of clauses 1-5, wherein the increased playback speed is determined based on at least one of: a user preference, user input received via a user interface, or a length of the portion of the audio signal stored in the audio buffer.

7. The computer-implemented method of clauses 1-6, wherein the portion of the audio signal stored in the audio buffer is played back until the playback of the portion of the audio signal in the audio buffer catches up with the audio signal.

8. The computer-implemented method of clauses 1-7, wherein integrating the explanatory phrase into the playback of the audio signal comprises: generating an acoustic representation of the explanatory phrase; and outputting the acoustic representation to a user.

9. The computer-implemented method of clauses 1-8, further comprising enabling voice cancellation or noise cancellation during integration of the explanatory phrase into the playback of the audio signal.

10. In some embodiments, a system comprises: a memory storing one or more software applications; and a processor that, when executing the one or more software applications, is configured to perform the steps of: detecting a speech portion included in an audio signal; determining that the speech portion comprises a domain-specific term; determining an explanatory phrase associated with the domain-specific term; and integrating the explanatory phrase associated with the domain-specific term into playback of the audio signal.

11. The system of clause 10, wherein the explanatory phrase is generated based on one or more search results retrieved from one or more data stores.

12. The system of clauses 10 or 11, wherein one or more weights are applied to the one or more search results based on reliability of the one or more data stores.

13. The system of clauses 10-12, wherein integrating the explanatory phrase into playback of the audio signal comprises storing, in an audio buffer, a portion of the audio signal occurring after the domain-specific term.

14. The system of clauses 10-13, wherein integrating the explanatory phrase into playback of the audio signal further comprises playing back the portion of the audio signal stored in the audio buffer using an increased playback speed.

15. The system of clauses 10-14, wherein the increased playback speed is determined based on at least one of: a user preference, user input received via a user interface, or a length of the portion of the audio signal stored in the audio buffer.

16. The system of clauses 10-15, wherein the portion of the audio signal stored in the audio buffer is played back until the play back of the portion of the audio signal in the audio buffer catches up with the audio signal.

17. In some embodiments, one or more non-transitory computer-readable media store instructions that, when executed by one or more processors, cause the one or more processors to perform the steps of: detecting a speech portion included in an audio signal; determining that the speech portion comprises a domain-specific term; determining an explanatory phrase associated with the domain-specific term; and integrating the explanatory phrase associated with the domain-specific term into playback of the audio signal.

18. The one or more non-transitory computer-readable media of clause 17, wherein integrating the explanatory phrase into playback of the audio signal comprises storing, in an audio buffer, a portion of the audio signal occurring after the domain-specific term.

19. The one or more non-transitory computer-readable media of clauses 17 or 18, further storing instructions that, when executed by the one or more processors, cause the one or more processors to perform the steps of: generating an acoustic representation of the explanatory phrase; and outputting the acoustic representation to the user.

20. The one or more non-transitory computer-readable media of clauses 17-19, further storing instructions that, when executed by the one or more processors, cause the one or more processors to perform the steps of: enabling voice cancellation or noise cancellation during integration of the explanatory phrase into the playback of the audio signal.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for explaining domain-specific terms detected in a media content stream, the computer-implemented method comprising:
   detecting a speech portion included in an audio signal;
   determining that the speech portion comprises a domain-specific term;
   disabling audio pass-through of the audio signal after determining that the speech portion comprises the domain-specific term;
   storing, in an audio buffer, a portion of the audio signal after the domain-specific term;
   determining an explanatory phrase associated with the domain-specific term;
   replacing the domain-specific term with the explanatory phrase in playback of the audio signal; and
   playing back the explanatory phrase;
   after playing back the explanatory phrase, playing back the buffered portion of the audio signal at an increased playback speed; and
   in response to determining that the buffered portion of the audio signal has caught up with the audio signal:
      stopping playback of the buffered portion of the audio signal, and
      enabling audio pass-through of the audio signal.

2. The computer-implemented method of claim 1, wherein the explanatory phrase is based on one or more contextual cues associated with the speech portion.

3. The computer-implemented method of claim 2, wherein the one or more contextual cues include one or more words before or after the speech portion.

4. The computer-implemented method of claim 1, wherein the increased playback speed is determined based on at least one of:
   a network speed, or
   a length of the buffered portion of the audio signal.

5. The computer-implemented method of claim 1, wherein the step of replacing the domain-specific term with the explanatory phrase in the playback of the audio signal comprises:
   generating an acoustic representation of the explanatory phrase; and
   replacing the domain-specific term with the acoustic representation.

6. The computer-implemented method of claim 1, further comprising enabling voice cancellation or noise cancellation during the step of playing back the explanatory phrase.

7. The computer-implemented method of claim 1, wherein the domain-specific term is associated with domains of knowledge known to a user and stored in a user profile of the user.

8. A system, comprising:
   a memory storing one or more software applications; and
   a processor that, when executing the one or more software applications, is configured to perform the steps of:
      detecting a speech portion included in an audio signal;
      determining that the speech portion comprises a domain-specific term;
      disabling audio pass-through of the audio signal in response to determining that the speech portion comprises the domain-specific term;
      storing, in an audio buffer, a portion of the audio signal after the domain-specific term;
      determining an explanatory phrase associated with the domain-specific term;
      replacing the domain-specific term with the explanatory phrase in playback of the audio signal;
      playing back the explanatory phrase;
      after playing back the explanatory phrase, playing back the buffered portion of the audio signal at an increased playback speed; and
      in response to determining that the buffered portion of the audio signal has caught up with the audio signal:

stopping playback of the buffered portion of the audio signal, and enabling audio pass-through of the audio signal.

9. The system of claim 8, wherein:

the explanatory phrase is generated based on one or more search results retrieved from one or more data stores; and one or more weights are applied to the one or more search results based on reliability of the one or more data stores.

10. The system of claim 8, wherein the increased playback speed is determined based on at least one of:

a network speed, or a length of the buffered portion of the audio signal.

11. One or more non-transitory computer-readable media storing instructions that, when executed by one or more processors, cause the one or more processors to perform the steps of:

detecting a speech portion included in an audio signal;

determining that the speech portion comprises a domain-specific term;

disabling audio pass-through of the audio signal after determining that the speech portion comprises the domain-specific term;

storing, in an audio buffer, a portion of the audio signal after the domain-specific term;

determining an explanatory phrase associated with the domain-specific term;

replacing the domain-specific term with the explanatory phrase in playback of the audio signal; and playing back the explanatory phrase;

after playing back the explanatory phrase, playing back the buffered portion of the audio signal at an increased playback speed; and in response to determining that the buffered portion of the audio signal has caught up with the audio signal:

stopping playback of the buffered portion of the audio signal, and enabling audio pass-through of the audio signal.

12. The one or more non-transitory computer-readable media of claim 11, further storing instructions that, when executed by the one or more processors, cause the one or more processors to perform the steps of:

generating an acoustic representation of the explanatory phrase; and replacing the domain-specific term with the acoustic representation.

13. The one or more non-transitory computer-readable media of claim 11, further storing instructions that, when executed by the one or more processors, cause the one or more processors to perform the steps of:

enabling voice cancellation or noise cancellation during the step of playing back the explanatory phrase.

\* \* \* \* \*